United States Patent Office
3,040,032
Patented June 19, 1962

3,040,032
SYNTHETIC PENICILLINS AND SALTS THEREOF
Frank Peter Doyle, 42 Hillside Gardens, Betchworth, Surrey, England; John Herbert Charles Nayler, London, England (Coombelea, Cliftonville, Dorking, Surrey, England); and George Newbolt Rolinson, Betchworth, England (Parkgate House, Newdigate, Surrey, England)
No Drawing. Filed Aug. 4, 1959, Ser. No. 831,484
Claims priority, application Great Britain July 2, 1959
6 Claims. (Cl. 260—239.1)

This invention relates to new synthetic compounds of value as antibacterial agents, as nutritional supplements in animal feeds, as agents for the treatment of mastitis in cattle and as therapeutic agents in poultry and animals, including man, in the treatment especially of infectious diseases caused by Gram-positive bacteria and, more particularly, relates to 6-cinnamamido-penicillanic acids and nontoxic salts thereof.

This application is a continuation-in-part of our prior, copending application S.N. 750,075, filed July 22, 1958, now Patent No. 2,941,995.

Antibacterial agents such as benzylpenicillin have proved highly effective in the past in the therapy of infections due to Gram-positive bacteria but such agents suffer from the serious drawbacks of being unstable in aqueous acid, e.g. upon oral administration, and of being ineffective against numerous so-called resistant strains of bacteria, e.g. penicillin-resistant strains of *Staphylococcus aureus* (*Micrococcus* var. *aureus*). In addition, benzylpenicillin is not an effective agent against many bacteria which produce pencillinase. Many of the compounds of the present invention, in addition to their potent antibacterial activity, exhibit resistance to destruction by acid or by penicillinase or are effective against benzylpenicillin-resistant strains of bacteria or inhibit benzyl penicillinase and thus potentiate the action of benzylpenicillin when admixed therewith.

There is provided, according to the present invention, a member selected from the group consisting of an acid having the formula

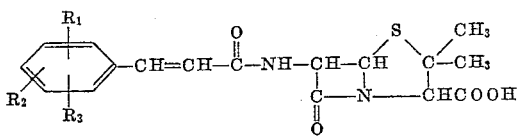

wherein $R_1$ and $R_2$ and $R_3$ each represent a member selected from the group consisting of hydrogen, nitro, amino, (lower)alkylamino, di(lower)alkylamino, acylamino (where the acylating agent is an aliphatic carboxylic acid containing from one to ten carbon atoms inclusive and the substituent may thus also be named (lower)alkanoylamino), (lower)alkyl (including straight and branched chain saturated aliphatic groups containing from one to ten carbon atoms inclusive), chloro, bromo, iodo, (lower)alkoxy, hydroxy and sulfamyl; and nontoxic salts thereof, including nontoxic metallic salts such as sodium, potassium, calcium and aluminum, the ammonium salt and substituted ammonium salts, e.g. salts of such nontoxic amines as trialkylamines, including triethylamine, procaine, dibenzylamine, N-benzyl-beta-phenethylamine, 1-ephenamine, N,N'-dibenzylethylenediamine, dehydroabietylamine, N,N'bis-dehydroabietylethylenediamine, and other amines which have been used to form salts with benzylpenicillin. Also included within the scope of the present invention are easily hydrolyzed esters which are converted to the free acid form by chemical or enzymatic hydrolysis.

The products of the present invention are prepared by reaction of 6-aminopenicillanic acid, preferably in the form of a neutral salt such as the sodium salt or the triethylamine salt, with an acid chloride having the formula

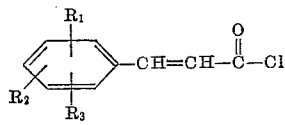

wherein $R_1$, $R_2$ and $R_3$ have the meaning set forth above, or its functional equivalent as an acylating agent for a primary amino group. Such equivalents include the corresponding carboxylic acid bromides, acid anhydrides and mixed anhydrides with other carboxylic acids, including monoesters, and particularly lower aliphatic esters, of carbonic acid.

Thus, an elegant procedure for preparing a compound of the present invention by way of a mixed anhydride with ethoxy- or isobutoxy-carbonic acid comprises mixing 0.01 mole of an acid (whose acid chloride is set forth above), 0.01 mole isobutyl chloroformate and 0.011 mole tertiary hydrocarbonyl or aliphatic amine such as triethylamine in an anhydrous, inert and preferably water-miscible solvent such as p-dioxane (e.g. 20 ml.) and if desired 2 ml. pure, dry acetone for about 30 minutes in the cold, e.g. at about 4° C. To this solution of the mixed anhydride there is then added a chilled solution of 0.01 mole 6-aminopenicillanic acid and 0.01 mole tertiary hydrocarbonyl amine, e.g. triethylamine, in, for example, 20 ml. of a solvent such as water. The reaction mixture is stirred for a period of an hour or so to form the substituted ammonium salt of the desired product. The mixture may then, if desired, be extracted at alkaline pH (such as pH 8); aqueous sodium bicarbonate may be used, for example, if necessary to adjust the pH with a water-immiscible solvent such as ether to remove unreacted starting materials. The product in the aqueous phase is then converted to the free acid, preferably in the cold under a layer of ether by the addition of dilute mineral acid, e.g. 5 N $H_2SO_4$ to pH 2. The free acid is then extracted into a water-immiscible, neutral organic solvent such as ether and the extract is washed with water quickly in the cold, if desired, and then dried, as with anhydrous $Na_2SO_4$. The product in the ethereal extract in its free acid form is then converted to any desired metal or amine salt by treatment with the appropriate base, e.g. a free amine such as procaine base or a solution of potassium 2-ethylhexanoate in dry n-butanol. These salts are usually insoluble in solvents such as ether and can be recovered in pure form by simple filtration.

Another method of preparing an ethereal solution of the acid form of a compound of the present invention comprises preparing a solution in 20 ml. water of 0.00463 mole 6-aminopenicillanic acid and 1.56 gm. sodium bicarbonate, adding 0.00476 mole of an acid chloride whose formula is set forth above and shaking vigorously at room temperature, e.g. for twenty to sixty minutes. The mixture is then extracted with ether to remove unreacted or hydrolyzed starting materials. The solution is then acidified (preferably in the cold) to pH 2, as with dilute sulfuric acid, and the free acid form of the product is extracted into ether (e.g., two portions of 25 ml.). This ethereal extract is dried, as with anhydrous sodium sulfate, and the drying agent is removed to leave a dry ethereal solution from which the product is easily isolated, preferably in the form of an ether-insoluble salt such as the potassium salt. This procedure is used when the acid chloride reacts with a primary amine more rapidly than it does with water, as determined by simple test. In this procedure the acid chloride may be replaced by an equimolar amount of the corresponding acid bromide or acid anhydride.

Since some of the antibiotic substances obtained by the process of this invention are relatively unstable compounds which readily undergo chemical changes resulting in the loss of an antibiotic activity, it is desirable to choose reaction conditions which are sufficiently moderate to avoid their decomposition. The reaction conditions chosen will, of course, depend largely upon the reactivity of the chemical reagent being used. In most instances, a compromise has to be made between the use of very mild conditions for a lengthy period and the use of more vigorous conditions for a shorter time with the possibility of decomposing some of the antibiotic substance.

The temperature chosen for the process of preparation of the derivatives of penicillanic acid should in general not exceed 30° C. and in many cases a suitable temperature is ambient temperature. Since the use of strongly acid or alkaline conditions in the process of this invention should be avoided, it has been found preferable to perform the process at a pH of from 6 to 9, and this can conveniently be achieved by using a buffer, for example, a solution of sodium bicarbonate, or a sodium phosphate buffer. In addition to the use of aqueous media for the reaction, including filtered fermentation broths or aqueous solutions of crude 6-aminopenicillanic acid, use can be made of organic solvents which do not contain reactive hydrogen atoms. Examples of such inert solvents are dimethylformamide, dimethylacetamide, chloroform, acetone, methyl isobutyl ketone and dioxane. Frequently it is highly satisfactory to add an aqueous solution of a salt of 6-aminopenicillanic acid to a solution of the acylating agent in an inert solvent and preferably in an inert solvent which is miscible with water, such as acetone or dimethylformamide. Virgorous stirring is of course advisable when more than one phase is present, e.g. solid and liquid or two liquid phases.

At the conclusion of the reaction, the products are isolated if desired by the techniques used with benzylpenicillin and phenoxymethylpenicillin. Thus, the product can be extracted into diethyl ether or n-butanol at acid pH and then recovered by lyophilization or by conversion to a solvent-insoluble salt, as by neutralization with an n-butanol solution of potassium 2-ethylhexanoate, or the product can be precipitated from aqueous solution as a water-insoluble salt of an amine or recovered directly by lyophilization, preferably in the form of a sodium or potassium salt. When formed as the triethylamine salt, the product is converted to the free acid form and thence to other salts in the manner used with benzylpenicillin and other penicillins. Thus, treatment of such a triethylamine compound in water with sodium hydroxide converts it to the sodium salt and the triethylamine may be removed by extraction, as with toluene. Treatment of the sodium salt with strong aqueous acid converts the compound to the acid form, which can be converted to other amine salts, e.g., procaine, by reaction with the amine base. Salts so formed are isolated by lyophilization or, if the product is insoluble, by filtration. A particularly elegant method of isolating the product as a crystalline potassium salt comprises extracting the product from an acidic, aqueous solution (e.g. pH 2) into diethyl ether, drying the ether and adding at least one equivalent of a solution of potassium 2-ethylhexanoate (e.g. 0.373 gm./ml.) in dry n-butanol. The potassium salt forms, precipitates, usually in crystalline form, and is collected by filtration or decantation.

When an acid chloride, an acid bromide or an acid anhydride is used in a process of the present invention, it is prepared from the corresponding acid according to the techniques set forth in the literature for cinnamic acid. In any instances where the substituted cinnamic acid has not been described, it is prepared from the appropriately substituted benzaldehyde by the Perkin reaction with acetic anhydride and potassium acetate to form the substituted cinnamic acid by the methods used to convert benzaldehyde to cinnamic acid.

6-aminopenicillanic acid is prepared according to Batchelor et al. (Nature 183, 257, 258, January 24, 1959) or Belgian Patent 569,728. It is used in the above reaction as the salt of a metal or a tertiary hydrocarbonyl amine or as an ester of a hydrocarbonyl alcohol.

Hydrocarbonyl alcohols and tertiary hydrocarbonyl amines are compounds having the formulae

and

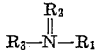

wherein the R groups contain only the elements carbon and hydrogen.

PREPARATION OF 6-AMINOPENICILLANIC ACID

As set forth in our prior, copending application S.N. 750,075 filed July 22, 1958, of which this application is a continuation-in-part, the intermediate 6-aminopenicillanic acid is isolated after removal of the natural penicillins from penicillin fermentation broths prepared without the use of added precursors such as phenylacetic acid. For this purpose, suitable penicillin-producing moulds include species of Penicillium, for example *Penicillium chrysogenum* 5120C, and the members of the notatum-chrysogenum group. The mould is grown preferably under aerobic submerged culture conditions. The culture medium used can be one of the generally accepted media commonly used in the preparation of penicillins. The culture medium usually consists essentially of a carbohydrate nutrient material, for example glucose or lactose; calcium carbonate, sodium sulphate, and a nitrogenous material capable of providing the nitrogen necessary for the growth of the mould. The nitrogenous material can be either a natural substance, for example peanut meal, or it can be one or more chemical compounds containing nitrogen, for example ammonium salts such as ammonium lactate or ammonium acetate. Where one or more chemical compounds are used as the nitrogenous material it is usual to incorporate in the culture medium very small amounts of a number of metals such as calcium, iron, zinc, copper, magnesium and manganese and these are normally introduced in the form of an aqueous solution of their salts. A suitable culture medium containing ammonium salts as the nitrogenous material is described by Jarvis and Johnson, J.A.C.S., 69, 3010 (1947), and J. Bact. 59, 51 (1950). Natural nitrogenous materials such as peanut meal usually contain sufficient amounts of suitable inorganic salts and thus when such materials are used in the culture medium it is usually not necessary to make a separate addition of inorganic salts.

The fermentation conditions used in the preparation of the fermentation liquor used in this invention can vary between wide limits, but it has been found preferable to use conditions similar to those commonly used in the preparation of Penicillin G. The temperature employed is preferably one from 20° C. to 35° C. and very satisfactory results have been obtained using a temperature of 25–27° C. The time required for the fermentation depends upon the culture medium and the mould used and the temperature at which the fermentation is carried out. Normal fermentation times are from 48 to 120 hours. The progress of the fermentation can be followed by means of periodic assay.

The fermentation liquor is obtained most satisfactorily when the fermentation is carried out under highly aerobic conditions. In the small scale operations referred to in the examples of this specification, aerobic conditions were achieved by shaking the fermentation mixture on a rotary shaking machine. When working on a larger scale, aerobic conditions can conveniently be obtained either by bubbling air or oxygen through the fermentation mixture, or by rapidly stirring the fermentation mixture. If desired, a combination of stirring and the bubbling of air or oxygen can be used.

It is sometimes preferred to prepare the antibiotic substances by the use of the isolated 6-aminopenicillanic acid or one of the intermediate concentrates obtained during its isolation. A concentrated solution of 6-aminopenicillanic acid can be prepared by evaporating the clarified harvest brew at reduced temperature and pressure to a small volume. If desired, the penicillins present in the brew can be largely removed by extraction with an organic solvent such as butyl acetate at an acid pH. After neutralizing the liquid substantial amounts of impurities can then be precipitated by the addition of solvents such as acetone, methanol or ethanol. After separating such impurities the clear liquor may then be further concentrated to give a concentrated preparation.

The production by the process of this invention of antibiotic material from fermentation liquor having little or no antibiotic activity is clearly indicated if, before the addition of one of the chemical reagents hereinbefore specified to the fermentation liquor, the penicillins already present as a result of the fermentation reaction by which the fermentation liquor was obtained are removed. This removal can readily be achieved as indicated above by extracting the penicillins from the acidified fermentation liquor by means of an organic solvent, for example, butyl acetate, in which the penicillins are soluble. It will be seen from the examples below that in some instances a very considerable increase in antibiotic activity was obtained as a result of the chemical modification of the fermentation liquor according to the process of this invention.

Thus, 6-aminopenicillanic acid was prepared and isolated as follows:

(a) A strain of Penicillium chrysogenum 5120C (obtained from Professor E. B. Chain, Istituto Superiore di Sanita, Rome) was first grown on a glycerol-molasses agar slope for 7 days at 26° C. Sterile distilled water was then added and the spores washed off the surface of the culture to produce a spore suspension. About 10 mls. of this suspension were used to inoculate 5 litres of seed medium in a 10-litre stainless steel stirred fermenter. The seed medium contained 8% w./v. corn steep liquor, 6% w./v. of dextrin and tap water, the pH being adjusted to 6.1 before sterilizing the fermenter and its contents. The tank was stirred at 500 r.p.m. with an air flow of 1 vol./vol./min. and maintained at 27° C. for 48 hours. A volume of 3.2 litres of the contents of this fermenter was then transferred aseptically into a 90-litre stainless steel fermenter containing 50 litres of fermentation medium consisting of peanut meal 3.0% w./v., lactose 4.0% w./v., $Na_2SO_4$ 0.1% w./v., $CaCO_3$ 1.0% w./v. and tap water. The pH was adjusted to 7.2 before the fermenter and its contents were sterilized. After inoculation the tank was maintained at 26–28° C. for 4 days and stirred at 600 r.p.m. by means of an impeller of 12.5 cms. diameter. Air bubbled through the tank at the rate of 1 vol./vol./min. Foaming was controlled by the periodic addition of lard oil containing 2% of octadecanol.

The brew obtained was clarified and 40 litres thereof was concentrated in vacuo to a volume of 4 litres. The pH was then adjusted to 3.0 and the precipitate which formed was removed by centrifuging and the clear liquor was extracted once with half its volume of butyl acetate. The aqueous phase was separated and the pH adjusted to 7.5. 3 vols. of acetone was then added with stirring and the precipitate removed by centrifuging. The clear liquor was then concentrated to 2280 mls. and the pH adjusted to 7.0. It had a potency of 54μ/mgm. assayed as described below.

The 6-aminopenicillanic acid was assayed by reacting a sample with phenylacetyl chloride and assaying the penicillin found by the cup plate method described by N. G. Heatley in Biochem. J., 38, 61 (1944), using B. subtilis as the bacterium. The purity of the preparation can then be expressed in units per mgm. (μ/mgm.) of dry substance.

The potency of pure 6-animopenicillanic acid assayed by this method is 2750μ/mgm.

(b) 1200 mls. of the concentrate of potency 54μ/mgm. were percolated through 200 gms. of Dowex I resin conditioned with hydrochloric acid. The column was washed with water and this wash was combined with the percolate. The assay of this solution proved it to contain 15% of the 6-aminopenicillanic acid applied. The column was then eluted with 0.05 N hydrochloric acid. The pooled active fractions of the eluate contained 81% of the original 6-aminopenicillanic acid, the solution assaying at 900μ/mgm. The eluate was then adjusted to pH 6.0 and concentrated to 25 mls. in vacuo, concentrated hydrochloric acid was added with stirring to bring the pH to 4.3 and the crystalline 6-aminopenicillanic acid then filtered off and washed with water followed by acetone, and then dried in vacuo. The yield was 1.0 gm. assaying at 2200μ/mgm. (80% pure). Repeated precipitation of the crystalline material from neutral aqueous solution by the addition of hydrochloric acid gave a white crystalline solid of melting point 209–210° C. assaying at 2740μ/mgm. analyzing as follows: (Found: C, 44.6; H, 5.7; N, 13.1; S, 14.1%. $C_8H_{12}O_3N_2S$ requires: C, 44.4; H, 5.6; N, 13.0; S, 14.8%.)

PREPARATION OF DERIVATIVES OF 6-AMINOPENICILLANIC ACID

The procedure to be followed in preparing antibiotic substances from 6-aminopenicillanic acid depends largely upon the extent to which the starting material has itself been purified. Thus 6-aminopenicillanic acid may be used in three different stages of purification, as indicated below:

(a) From Isolated 6-Aminopenicillanic Acid

When 6-aminopenicillanic acid is available in relatively pure form it is only necessary to use a small excess (ca. 20%) of reagent and the product is, in turn, obtained fairly pure (as indicated by manometric assay using penicillinase).

The reagents used in this way include fifteen different monocarboxylic acid chlorides and also adipyl chloride, propionic anhydride, carbobenzoxyglycine ethoxy-formic anhydride, benzyl chloroformate, and p-toluenesulphonyl chloride.

(b) From 6-Aminopenicillanic Acid Concentrates

The starting material was a clarified fermentation liquor which has been subjected to an initial concentration procedure and from which the natural penicillins had been substantially removed by solvent extraction at pH 2 to 3. The neutralized aqueous solution usually contained 0.6–1.2 mg./ml. of 6-aminopenicillanic acid, which represented about 1% of the total solids present.

With such material it was necessary to use a much larger excess of reagent (10 to 50 times the theoretical amount) because various impurities (e.g. amino-acids and simple peptides) would also be susceptible to acylation and similar reactions. The products were worked up in essentially the same way as in (a), but the resulting sodium salts were, of course, very much less pure.

The reagents used in this way include phenoxyacetyl chloride, phenylacetyl chloride, α-chlorophenylacetyl chloride, chloroacetyl chloride, diphenylacetyl chloride, and adipyl chloride (all of which had also been reacted by method (a)) and also α-naphthylacetyl chloride, β-naphthoxyacetyl chloride and p-nitrophenoxyacetyl chloride.

(c) From Dilute Brew

The initial material was the original clarified fermentation brew from which natural penicillins had been substantially removed by solvent extraction at pH 2 to 3, but which had not been concentrated. It was thus about ten times more dilute than the solutions used in method (b). Use of a large excess of reagent was again essential. With this very dilute material no attempt was made to isolate the reaction products, but the formation of antibiotic material was demonstrated by the increased antibacterial activity of the solution after reaction and by paper chromatography, a new zone of biologically active material being detected in every case.

The reagents used successfully in this way include phenoxyacetyl chloride, phenylacetyl chloride, α-naphthylacetyl chloride, α-naphthoxyacetyl chloride, β-naphthoxyacetylchloride, p-nitrophenoxyacetyl chloride, α-chlorophenylacetyl chloride, diphenylacetyl chloride, crotonyl chloride, chloroacetyl chloride, phthalimidoacetyl chloride, benzoyl chloride, hexahydrobenzoyl chloride, m-sulphobenzoyl chloride, adipyl chloride, propionic anhydride, and n-butyric anhydride.

Two typical procedures are illustrated in detail as performed with phenoxyacetyl chloride to produce the known penicillin V, thus:

PROCEDURE A

A strain of *Penicillium chrysogenum* (5120C obtained from Professor E. B. Chain, Istituto Superiore di Sanita, Rome) was grown on a glycerol-molasses agar slope for 7 days at 26° C. The spores obtained were removed by washing with sterile distilled water and the suspension of spores obtained was used to inoculate 100 ml. of a culture medium contained in a 500 ml. conical flask. The flask and its contents had previously been sterilized with steam under pressure in an autoclave. The culture medium used was one having the following composition:

| | Parts by weight |
|---|---|
| Water | 100 |
| Corn steep liquor | 8 |
| "Liquid glucose" | 6 | and the pH of the medium had been adjusted to a value of 5.2–5.3 by the addition of a solution of sodium hydroxide. The "liquid glucose" used was a mixture of carbohydrates consisting essentially of maltose, glucose and low molecular weight dextrins. The inoculated flask was shaken for 48 hours at a constant temperature of 26° C. on a rotary shaking machine having a throw of 3.4 cm. and operating at 250 r.p.m. At the end of this period of 48 hours a substantial growth of mycelium had been obtained in the flask. The resulting culture was then used to inoculate a synthetic fermentation medium without the addition of an added precursor. The fermentation medium used had the following position:

| | Parts by weight |
|---|---|
| Water | 100.0 |
| Lactose | 4.0 |
| Glucose | 2.0 |
| Ammonium lactate | 0.5 |
| Ammonium acetate | 0.3 |
| $KH_2PO_4$ | 0.3 |
| $Na_2SO_4$ | 0.05 |
| $FeSO_4 \cdot 7H_2O$ | 0.01 |
| $MgSO_4 \cdot 7H_2O$ | 0.025 |
| $ZnSO_4 \cdot 7H_2O$ | 0.002 |
| $MnSO_4$ | 0.002 |
| $CaCl_2 \cdot 2H_2O$ | 0.005 |
| $CuSO_3 \cdot 5H_2O$ | 0.0005 |
| $CaCO_3$ | 1.0 |

The pH of the fermentation medium was about 6. The fermentation was carried out in a flask on a shaking machine at 26° C.

At the end of the 96 hours' fermentation period, the mycelium obtained was filtered from the fermentation broth and the fermentation liquor obtained as the filtrate was acidified to pH 3 with phosphoric acid and extracted once with half of its volume of butyl acetate at 5° C. which removed most of the penicillins which it contained.

The extracted fermentation liquor was neutralized with sodium hydroxide solution and assayed by means of the cup plate method described by N. G. Heatley in Biochem. J. 38, 61 (1944), using *B. subtilis* as the bacterium.

A 50 ml. portion of the extracted fermentation liquor was brought to pH 8 by the addition of solid sodium bicarbonate and stirred at 0° C. while a solution of 0.5 g. of phenoxyacetyl chloride in acetone was added in the course of a few minutes. The mixture was stirred at 0° C. for one hour, filtered, and excess reagent was removed by extraction with three portions of ether.

The ether extracts were themselves washed with water and the washings added to the main aqueous solution which which was then readjusted to pH 6 to 7 by the addition of hydrochloric acid.

Assay of the aqueous solution obtained (which had a volume of 65 ml.) using the method referred to above, showed that it contained a material having considerable antibiotic activity which was about 11 times greater for the whole volume of liquid than that of the initial solution. The results obtained from the assay were as follows:

| | Activity (international units) |
|---|---|
| Extracted fermentation liquid (volume 50 ml.) | 650 |
| Reaction product (volume 65 ml.) | 7,150 |

By means of paper chromatography it was shown that the antibiotic material contained in the aqueous solution had an Rf value of the same order as penicillin V and the stability of the aqueous solution at pH 2 also indicated a resemblance to that of penicillin V.

PROCEDURE B

This procedure is typical of the reaction of isolated 6-aminopenicillanic acid with monocarboxylic acid chlorides.

A solution of phenoxyacetyl chloride (360 mgm.) in dry acetone (5 ml.) was added dropwise during 10 minutes to a stirred solution of 6-aminopenicillanic acid (450 mgm., approximately 75% pure) in 3% aqueous sodium bicarbonate (18 ml.) and acetone (12 ml.). When addition was complete the mixture was stirred at room temperature for 30 minutes and then extracted with ether (30 ml. in 3 portions), only the aqueous phase being retained. This aqueous solution was covered with butanol (5 ml.) and adjusted to pH 2 by the addition of N hydrochloric acid. After separating the layers, the aqueous phase was extracted with two 2.5 ml. portions of butanol, adjusting to pH 2 each time. The combined butanol solutions (which at this stage contained the free penicillin acid) were washed with water (3×2 ml.) and then shaken with water (10 ml.) to which sufficient 3% sodium bicarbonate solution was added to bring the aqueous phase to pH 7. The butanol solution was further extracted with two 5 ml. portions of water to each of which was added enough bicarbonate solution to produce an aqueous phase of pH 7. The combined aqueous solutions were washed with ether (20 ml.) and then evaporated at low temperature and pressure to leave the crude sodium salt of phenoxymethyl penicillin which, after drying in a vacuumm desiccator, was obtained as a slightly hygroscopic powder (591 mgm.).

The purity of the product was estimated by the penicillinase assay as 73% and, by bioassay, as 68%. In its chromatographic behavior and its antibacterial spectrum the product showed no significant difference from authentic phenoxymethyl penicillin. It also exhibited the relative stability towards acids which is characteristic of this particular penicillin. No loss of activity could be detected after 2 hours at pH 2.

The following examples will serve to illustrate this invention without limiting it thereto.

EXAMPLE 1

The sodium salt of styryl penicillin (6-cinnamamidopenicillanic acid) was obtained by the process of Procedure B using cinnamoyl chloride instead of phenoxyacetyl chloride. The yield of crude sodium salt (purity 24%) was 106 mgm. per 100 mgm. of 6-aminopenicillanic acid.

The product inhibited the growth of *Staph. aureus* at a concentration of 1 in 1,600,000 and of *B. subtilis* at a concentration of 1 in 800,000.

EXAMPLE 2

Triethylamine (2 ml.) was added at 10° C. to 2-chlorocinnamic acid (2.74 g., 0.015 mole) dissolved in 30 ml. pure, dry p-dioxane. After stirring ten minutes, isobutyl chloroformate (2.2 g., 0.016 mole) in 20 ml. dioxane was added dropwise over thirty minutes at 10° C. The resulting solution was stirred 160 minutes and then, still at 10° C., there was added dropwise over thirty minutes a solution of 6-aminopenicillanic acid (3.46 g., 0.016 mole) in 30 ml. water and 4 ml. triethylamine. The solution was then stirred thirty minutes at 10° C. and three hours at room temperature. After addition of 40 ml. water, the solution was twice extracted with 100 ml. portions of ether (which was discarded) and was covered with 100 ml. ether, acidified to pH 2 with 5 M $H_2SO_4$ and twice extracted with 100 ml. portions of ether. This ethereal extract containing the product, 6-(2-chlorocinnamamido)penicillanic acid, was washed with 100 ml. water, dried ten minutes with swirling over $Na_2SO_4$ and filtered. The addition of 9.4 ml. of dry n-butanol containing 0.373 gm./ml. potassium 2-ethylhexanoate precipitated crystalline, water-soluble potassium 6-(2-chlorocinnamamido)penicillanate which was collected, dried and found to weigh 4.6 gm., to decompose above 100° C. on heating, to contain a β-lactam ring by infrared analysis and to inhibit *Staph. aureus* Smith at a concentration of 0.156 mcg./ml.

EXAMPLE 3

A clear solution of triethylamine (0.47 gm., 0.645 ml., 0.00463 mole) and 4-chlorocinnamic acid (0.845 gm., 0.00463 mole) in 20 ml. reagent grade acetone was chilled to 0–5° C. and isobutyl chloroformate (0.61 ml., 0.632 g., 0.00463 mole) was added and the mixture was stirred at 0–5° C. for thirty minutes. A solution of 6-aminopenicillanic acid (1.0 gm., 0.00463 mole), 20 ml. water and 0.65 ml. (0.00463 mole) triethylamine was chilled to 0° C. and added over a period of ten minutes to the acetone solution of mixed anhydride prepared above. After 15 minutes the ice-bath was removed and the mixture was stirred for an additional 75 minutes. The reaction mixture was chilled to 5° C., covered with 30 ml. ether and adjusted to pH 2 with 10% $H_3PO_4$. After mixing, the ether layer containing the product, 6-(4-chlorocinnamamido)penicillanic acid, was separated, and filtered through anhydrous $Na_2SO_4$. Addition of 3 ml. dry n-butanol containing 0.373 gm./ml. potassium 2-ethylhexanoate followed by addition of more ether precipitated potassium 6-(4-chlorocinnamamido)penicillanate as an oil which was converted to crystalline form by trituration in ether, dried in vacuo, over $P_2O_5$, and recovered as a pale yellow powder, 0.80 gm. which on heating darkened slightly above 130° C., turned red at 150° C., shrank slightly above 155° C., turned black at 160° C. and partially melted at 165°–175° C. The product was crystalline and readily soluble in water, contained the β-lactam ring as shown by infrared analysis and inhibited *Staph. aureus* Smith at a concentration of 0.625 mcg./ml.

EXAMPLE 4

Following the procedure of Example 3 using double the quantity of all reagents and replacing the 4-chlorocinnamic acid with 2,3-dimethoxycinnamic acid (1.92 gm., 0.00926 mole) there was produced 6-(2,3-dimethoxycinnamamido)penicillanic acid which was recovered as its potassium salt, 1.82 gm. yellow crystalline solid which on heating darkened above 120° C., began to change to a red color above 120° C. and showed slight bubbling at 165–175° C. The potassium salt was readily soluble in water, contained the β-lactam ring as shown by infrared analysis and inhibted *Staph. aureus* Smith at a concentration of 0.62 mcg./ml.

EXAMPLE 5

In the procedure of Example 3, the 4-chlorocinnamic acid is replaced by 0.00463 mole p-sulfamylcinnamic acid,
3,4-dimethoxycinnamic acid,
4-methoxycinnamic acid,
3-methylcinnamic acid,
3-dimethylaminocinnamic acid,
2-methoxycinnamic acid,
3,4,5-trimethoxycinnamic acid,
2,4-dichlorocinnamic acid,
2-nitrocinnamic acid,
4-methylaminocinnamic acid,
2-acetamidocinnamic acid,
2,4-dimethylcinnamic acid,
2,4,5-trimethylcinnamic acid,
4-isopropylcinnamic acid,
3-bromocinnamic acid,
2-iodocinnamic acid,
2-ethylaminocinnamic acid,
2,5-dihydroxycinnamic acid,
3,5-dinitrocinnamic acid,
3,4-dichlorocinnamic acid,
2-methylcinnamic acid,
4-hydroxycinnamic acid,
2-hydroxycinnamic acid, and
4-hydroxy-3-methoxycinnamic acid, respectively, to produce the acids 6-(4-sulfamylcinnamamido)penicillanic acid,
6-(3,4-dimethoxycinnamamido)penicillanic acid,
6-(4-methoxycinnamamido)penicillanic acid,
6-(3-methylcinnamamido)penicillanic acid,
6-(3-dimethylaminocinnamamido)penicillanic acid,
6-(2-methoxycinnamamido)penicillanic acid,
6-(3,4,5-trimethoxycinnamamido)penicillanic acid,
6-(2,4-dichlorocinnamamido)penicillanic acid,
6-(2-nitrocinnamamido)penicillanic acid,
6-(4-methylaminocinnamamido)penicillanic acid,
6-(2-acetamidocinnamamido)penicillanic acid,
6-(2,4-dimethylcinnamamido)penicillanic acid,
6-(2,4,5-trimethylcinnamamido)penicillanic acid,
6-(4-isopropylcinnamamido)penicillanic acid,
6-(3-bromocinnamamido)penicillanic acid,
6-(2-iodocinnamamido)penicillanic acid,
6(2-ethylaminocinnamamido)penicillanic acid,
6-(2,5-dihydroxycinnamamido)penicillanic acid,
6-(3,5-dinitrocinnamamido)penicillanic acid,
6-(3,4-dichlorocinnamamido)penicillanic acid,
6-(2-methylcinnamamido)penicillanic acid,
6-(4-hydroxycinnamamido)penicillanic acid,
6-(2-hydroxycinnamamido)penicillanic acid, and
6-(4-hydroxy-3-methoxycinnamamido)penicillanic acid, respectively, which are isolated as their solid, water-soluble potassium salts and found to inhibit *Staph. aureus* Smith at concentrations below 0.001 percent by weight.

We claim:
1. A member selected from the group consisting of an acid having the formula

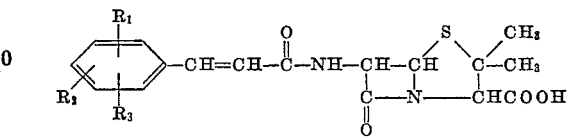

wherein $R_1$, $R_2$ and $R_3$ each represent a member selected from the group consisting of hydrogen, nitro, amino, (lower)alkylamino, di(lower)alkylamino, (lower)alkanoylamino, (lower)alkyl, chloro, bromo, iodo, (lower)alkoxy, hydroxy and sulfamyl; and its sodium, potassium, calcium, aluminum and ammonium salts and its salts with a nontoxic amine selected from the group consisting of tri(lower)alkylamines, procaine, dibenzylamine, N-benzyl-beta-phenethylamine, 1-ephenamine, N,N'-dibenzylethylenediamine, dehydroabietylamine and N,N'-bis-dehydrobietylethylenediamine.

2. 6-cinnamamidopenicillanic acid.
3. 6-(2-chlorocinnamamido)penicillanic acid.
4. 6-(4-chlorocinnamamido)penicillanic acid.
5. 6-(2,3-dimethoxycinnamamido)penicillanic acid.
6. 6-(3-methylcinnamamido)penicillanic acid.

References Cited in the file of this patent

UNITED STATES PATENTS

| | | |
|---|---|---|
| 2,479,295 | Behrens et al. | Aug. 16, 1949 |
| 2,479,296 | Behrens et al. | Aug. 16, 1949 |
| 2,479,297 | Behrens et al. | Aug. 16, 1949 |
| 2,934,540 | Sheehan | Apr. 26, 1960 |
| 2,941,995 | Doyle et al. | June 21, 1960 |

FOREIGN PATENTS

| | | |
|---|---|---|
| 569,728 | Belgium | Nov. 15, 1958 |

OTHER REFERENCES

The Chemistry of Penicillins, pages 676–679 (Princeton University Press), 1949.